US012371844B2

(12) United States Patent
Attar et al.

(10) Patent No.: US 12,371,844 B2
(45) Date of Patent: Jul. 29, 2025

(54) FILTERING CAP FOR AN IMPELLER OF A VERTICAL AXIS LAUNDRY APPLIANCE

(71) Applicant: WHIRLPOOL CORPORATION, Benton Harbor, MI (US)

(72) Inventors: Mohsin M. Attar, Pune (IN); Anayancy Campos, Nuevo León (MX); Marcos L. Costa, Joinville (BR); Sandip K. Kardile, Pune (IN); Danilo Ferreira de Oliveira Randstad, São Paulo (BR); Aliander F. Silva, São Paulo (BR); Eric J. Vasko, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 17/874,389

(22) Filed: Jul. 27, 2022

(65) Prior Publication Data

US 2024/0035226 A1 Feb. 1, 2024

(51) Int. Cl.
*D06F 39/10* (2006.01)
*B01D 33/073* (2006.01)
(Continued)

(52) U.S. Cl.
CPC ........... *D06F 39/10* (2013.01); *B01D 33/073* (2013.01); *B01D 33/11* (2013.01); *D06F 23/04* (2013.01); *D06F 37/24* (2013.01); *D06F 39/083* (2013.01)

(58) Field of Classification Search
CPC ........ D06F 17/10; D06F 39/10; D06F 37/145; D06F 23/04; D06F 39/024; D06F 39/083;
(Continued)

(56) References Cited

U.S. PATENT DOCUMENTS 2,406,198 A * 8/1946 Clark ...................... B64C 13/16
68/17 A
2,498,894 A * 2/1950 McCormick ............ D06F 13/04
68/17 A
(Continued)

FOREIGN PATENT DOCUMENTS

BR 102012030892 9/2014
CN 105133245 A * 12/2015
(Continued)

OTHER PUBLICATIONS

Jiang et al., "Washing Machine Impeller" Dec. 16, 2015, machine translation of CN-105155193-A (Year: 2015).*

*Primary Examiner* — David G Cormier
*Assistant Examiner* — Thomas Bucci
(74) *Attorney, Agent, or Firm* — Price Heneveld LLP

(57) ABSTRACT

A washing appliance includes a drum that is rotationally operable within a tub about a vertical rotational axis. An impeller is positioned within a lower portion of the drum and is rotationally operable about the vertical rotational axis. The impeller includes a plurality of flow channels that extend below the impeller and between the impeller and the tub. A receiver is positioned at a top of the impeller and includes apertures that are in communication with the respective flow channels. A filtering cap is disposed on a top of the receiver and positioned within a medial horizontal level of the tub. The filtering cap includes inlets that direct a toroidal flow into a removable particulate chamber positioned within the filtering cap. The toroidal flow is further directed through the respective flow channels to continue through the toroidal flow within the drum.

20 Claims, 11 Drawing Sheets

(51) Int. Cl.
*B01D 33/11* (2006.01)
*D06F 23/04* (2006.01)
*D06F 37/24* (2006.01)
*D06F 39/08* (2006.01)

(58) Field of Classification Search
CPC ....... D06F 37/24; B01D 33/11; B01D 33/073; B01D 2201/29; B01D 29/15; B01D 29/23; B01D 35/30
USPC ................... 68/18 FA, 17 A, 134, 18 F, 111
See application file for complete search history.

(56) References Cited

U.S. PATENT DOCUMENTS

| | | | | |
|---|---|---|---|---|
| 2,642,733 A * | 6/1953 | McCormick | D06F 13/00 | 68/17 R |
| 2,942,444 A * | 6/1960 | Abresch | D06F 39/10 | 68/17 A |
| 2,953,006 A * | 9/1960 | Brucken | D06F 39/024 | 68/17 A |
| 2,976,711 A * | 3/1961 | Smith | D06F 39/024 | 68/53 |
| 3,314,253 A * | 4/1967 | Smith | D06F 13/00 | 68/53 |
| 3,330,135 A * | 7/1967 | Douglas | D06F 13/00 | 68/17 A |
| 3,381,504 A * | 5/1968 | Smith | D06F 13/00 | 68/18 FA |
| 3,381,505 A * | 5/1968 | Smith | D06F 13/00 | 68/53 |
| 3,724,242 A * | 4/1973 | Davis | D06F 39/024 | 68/17 A |
| 4,338,802 A | 7/1982 | Ohmann | | |
| 4,402,198 A * | 9/1983 | Cartier | D06F 13/02 | 68/53 |
| 4,417,457 A * | 11/1983 | Brenner | D06F 39/024 | 68/17 A |
| 4,420,952 A * | 12/1983 | Brenner | D06F 13/02 | 68/53 |
| 5,012,658 A * | 5/1991 | Shikamori | D06F 13/02 | 68/133 |
| 5,421,174 A * | 6/1995 | Kim | D06F 13/02 | 68/17 R |
| 5,680,780 A * | 10/1997 | Kim | D06F 17/10 | 68/134 |
| 5,829,276 A * | 11/1998 | Suh | D06F 17/10 | 68/23.5 |
| 5,906,116 A * | 5/1999 | Kim | D06F 17/10 | 68/53 |
| 5,921,114 A * | 7/1999 | Jung | D06F 17/10 | 68/133 |
| 6,070,439 A * | 6/2000 | Jung | D06F 17/10 | 68/53 |
| 7,392,672 B2 * | 7/2008 | Kim | D06F 17/06 | 68/132 |
| 8,733,137 B2 * | 5/2014 | Kim | D06F 17/10 | 68/132 |
| 10,914,031 B2 | 2/2021 | Piekarski et al. | | |
| 2003/0200774 A1* | 10/2003 | Kim | D06F 17/06 | 68/132 |
| 2013/0319056 A1* | 12/2013 | Lee | D06F 17/10 | 68/132 |
| 2014/0026624 A1* | 1/2014 | Oh | D06F 13/00 | 68/18 F |
| 2016/0032515 A1* | 2/2016 | Lee | D06F 21/08 | 68/131 |
| 2018/0038032 A1* | 2/2018 | Yoon | D06F 37/145 | |
| 2018/0313022 A1* | 11/2018 | Piekarski | D06F 37/145 | |
| 2018/0313023 A1* | 11/2018 | Piekarski | B01D 33/11 | |
| 2018/0313024 A1* | 11/2018 | Piekarski | D06F 39/088 | |
| 2022/0127776 A1* | 4/2022 | Park | D06F 39/083 | |
| 2022/0290357 A1* | 9/2022 | Bhavsar | D06F 39/088 | |

FOREIGN PATENT DOCUMENTS

| | | | |
|---|---|---|---|
| CN | 105155193 A * | 12/2015 | |
| CN | 105369521 A * | 3/2016 | |
| EP | 2980296 A1 * | 2/2016 | D06F 13/00 |
| KR | 1020050050290 | 5/2005 | |

\* cited by examiner

FILTERING CAP FOR AN IMPELLER OF A VERTICAL AXIS LAUNDRY APPLIANCE

BACKGROUND OF THE DISCLOSURE

The present disclosure generally relates to laundry appliances, and more specifically, to a laundry appliance having an impeller within a rotating drum, where the impeller includes a filtering cap with one or more filtration mechanisms that separate particulate matter, such as pet hair, from wash fluid that is used for treating laundry within a rotating drum. The impeller is typically positioned within a vertical-axis laundry appliance that is rotationally operable relative to a drum. The impeller and the rotating drum operate within a wash tub that holds the wash fluid for delivery through a perforated wall of the rotating drum.

SUMMARY OF THE DISCLOSURE

According to one aspect of the present disclosure, a washing appliance includes a tub that is positioned within an outer cabinet. A drum is rotationally operable within the tub about a vertical rotational axis. An impeller is positioned within a lower portion of the drum and is rotationally operable relative to the drum about the vertical rotational axis. The impeller includes a plurality of external vanes that define respective flow channels. A receiver is positioned at a top of the impeller. The receiver includes apertures that are in in communication with the respective flow channels. A plurality of structural ribs are disposed on an underside of the impeller. The respective flow channels and the plurality of structural ribs cooperate to promote a toroidal flow of wash fluid within the drum. A filtering cap is disposed on a top of the receiver and positioned within a medial horizontal level of the tub. The filtering cap includes a plurality of inlets that direct the toroidal flow into a removable particulate chamber that is positioned within the filtering cap. The toroidal flow is further directed through the respective flow channels to continue through the toroidal flow within the drum.

According to another aspect of the present disclosure, a washing appliance includes a tub that is positioned within an outer cabinet. A drum is rotationally operable within the tub about a vertical rotational axis. An impeller is positioned within a lower portion of the drum and is rotationally operable relative to the drum about the vertical rotational axis. The impeller includes a plurality of respective flow channels that extend along an underside of the impeller. A receiver positioned at a top of the impeller. The receiver includes apertures that are in communication with the respective flow channels. A multi-part filtering cap includes a central filtering chamber that extends upward from the receiver and a plurality of horizontal filter members that are selectively positioned on top of the receiver and attached to the central filtering chamber to define a desired filtering height. The plurality of horizontal filter members and the central filtering chamber define respective filtering chambers that are layered above the receiver. Each of the respective filtering chambers directs wash fluid through the central filtering chamber and through the receiver and the respective flow channels.

According to yet another aspect of the present disclosure, a washing appliance includes a tub that is positioned within an outer cabinet. A drum is rotationally operable within the tub about a vertical rotational axis. An impeller is positioned within a lower portion of the drum and is rotationally operable relative to the drum about the vertical rotational axis. The impeller includes a plurality of flow channels that extend below the impeller and between the impeller and the tub. A receiver is positioned at a top of the impeller. The receiver includes apertures that are in in communication with the respective flow channels. A filtering cap is disposed on a top of the receiver and positioned within a medial horizontal level of the tub. The filtering cap includes a plurality of inlets that direct a toroidal flow into a removable particulate chamber that is positioned within the filtering cap. The toroidal flow is further directed through the respective flow channels to continue through the toroidal flow within the drum.

These and other features, advantages, and objects of the present disclosure will be further understood and appreciated by those skilled in the art by reference to the following specification, claims, and appended drawings.

Figure 1:
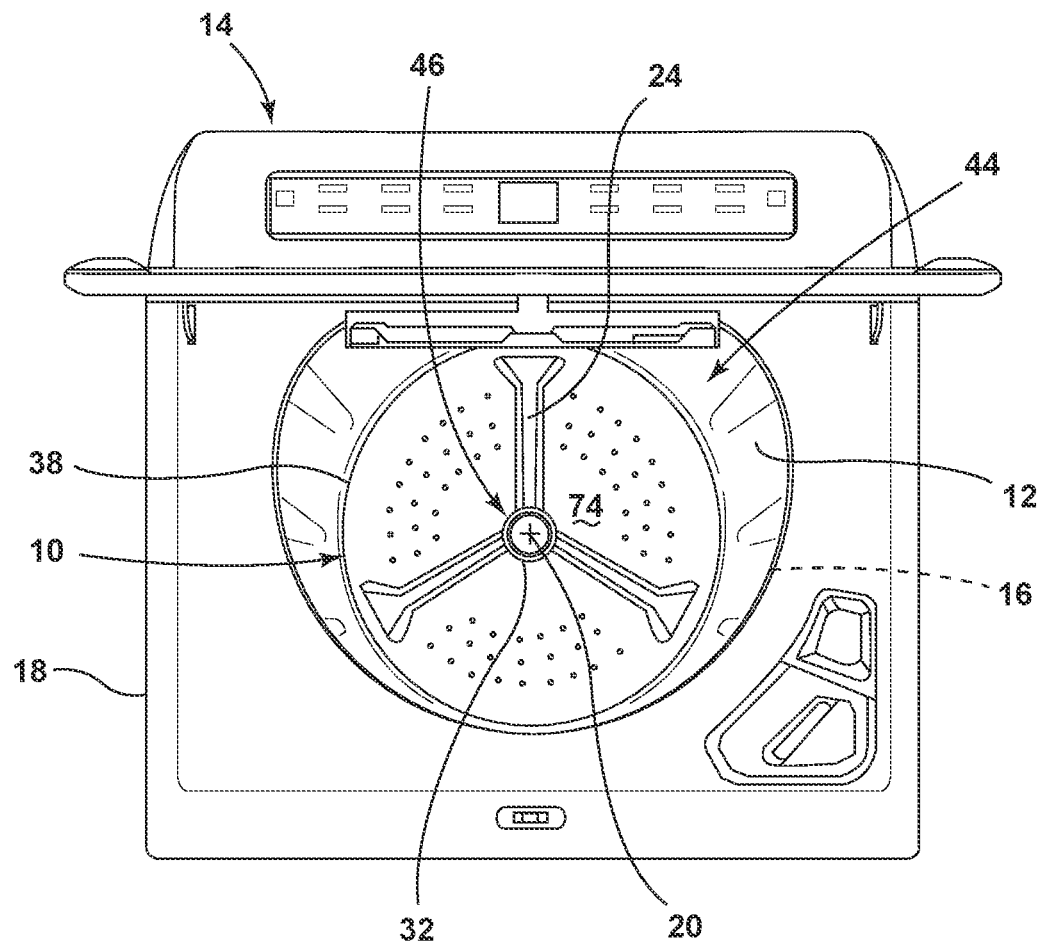
FIG. 1 is a top perspective view of a vertical-axis laundry appliance and showing an aspect of the filtering cap of an impeller.
Figure 2:
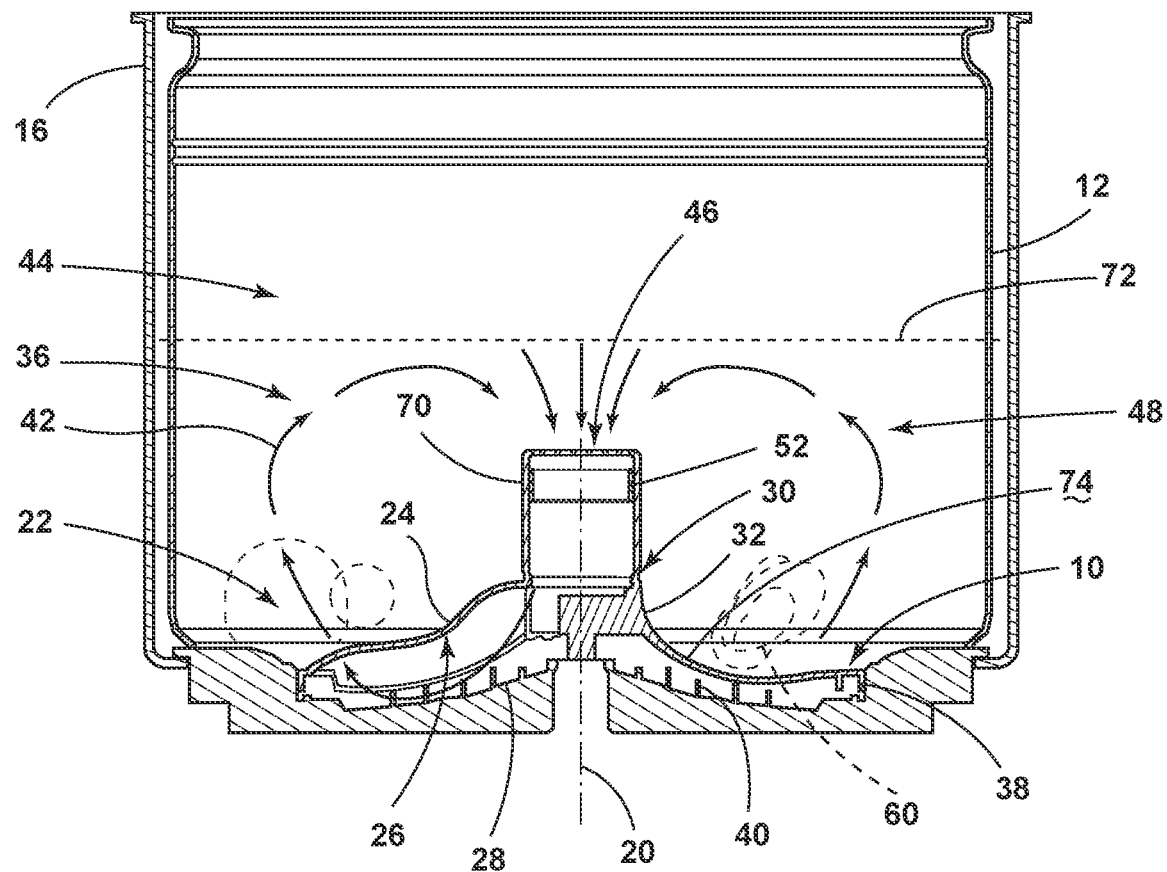
FIG. 2 is a schematic cross-sectional view of a vertical-axis laundry appliance that incorporates an aspect of the filtering cap.
Figure 3:
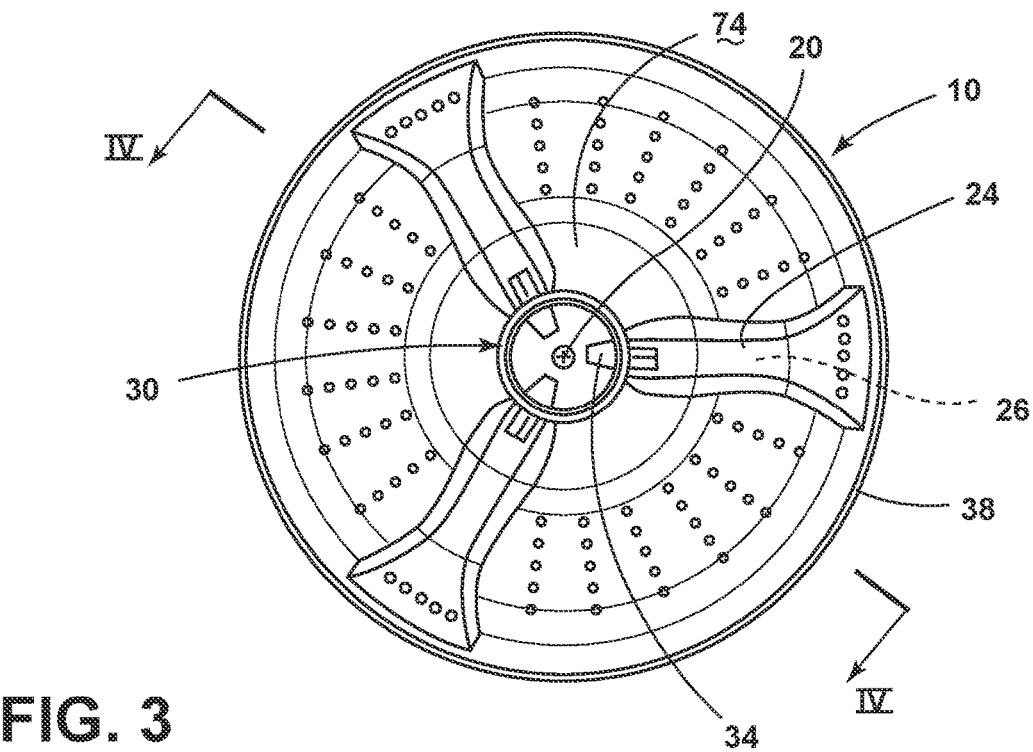
FIG. 3 is a top plan view of an aspect of the impeller and showing a configuration of the receiver onto which the filtering cap is attached.

The components in the figures are not necessarily to scale, emphasis instead being placed upon illustrating the principles described herein.

DETAILED DESCRIPTION

The present illustrated embodiments reside primarily in combinations of method steps and apparatus components related to a filtering cap for an impeller of a vertical axis washing appliance where the filtering cap is installed at an elevated location within the processing space of the drum and where the impeller directs a toroidal flow of wash fluid through the filtering cap to separate out pet hair and other fine particulate matter from the wash fluid within the drum. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-15, reference numeral 10 generally refers to an impeller that is rotationally operable within a rotating drum 12 of a vertical-axis laundry appliance 14. The impeller 10 is configured to rotate with the rotating drum 12 and can also rotate independently of the rotating drum 12 depending upon the particular laundry cycle being performed. According to the various aspects of the device, the washing appliance 14 includes a tub 16 that is positioned within an outer cabinet 18. The drum 12 is rotationally operable within the tub 16 about a vertical rotational axis 20. The impeller 10 is positioned within a lower portion 22 of the drum 12 and is rotationally operable within the drum 12 about the vertical rotational axis 20. The impeller 10 for the appliance 14 includes a plurality of external vanes 24 that define respective flow channels 26. These flow channels 26 are typically defined under the external vanes 24 and within an underside 28 of the impeller 10. A receiver 30 is positioned at a top 32 of the impeller 10. The receiver 30 includes various flow apertures 34 that are in communication with the respective flow channels 26 and provide for a movement of wash fluid 36 from the receiver 30, through the respective flow channels 26, into an outer edge 38 of the impeller 10. A plurality of structural ribs 40 are disposed on the underside 28 of the impeller 10. The respective flow channels 26 and the plurality of structural ribs 40 cooperate to promote a toroidal flow 42 of wash fluid 36 through the impeller 10 and around a processing space 44 defined within the tub 16 and the drum 12. A filtering cap 46 is selectively attached to the receiver 30. When attached to the receiver 30, the filtering cap 46 is positioned within a medial horizontal level 48 of the drum 12, which is generally above the lower portion 22 and the remainder of the impeller 10. The filtering cap 46 includes a plurality of inlets 50 that direct the toroidal flow 42 of wash fluid 36 into a removable particulate chamber 52 that is positioned within the filtering cap 46. The toroidal flow 42 of wash fluid 36 is further directed from the removable particulate chamber 52 and through the receiver 30 and the respective flow channels 26 to continue the toroidal flow 42 of wash fluid 36 within the drum 12.

As exemplified in FIGS. 1-15, use of the filtering cap 46 that is positioned within the medial horizontal level 48 of the tub 16 is configured to receive wash fluid 36 via the toroidal flow 42. This positioning of the filtering cap 46 locates the plurality of inlets 50 of the filtering cap 46 generally above the articles 60 being processed within the drum 12. Where there are a large number of articles 60 being processed within the drum 12, the elevated position of the filtering cap 46 and the inlets 50 above the lower portion 22 positions the filtering cap 46 above a majority of the articles 60 being processed. Accordingly, this elevated location of the filtering cap 46 provides a condition where the articles 60 do not impede the toroidal flow 42 of wash fluid 36 into the inlets 50 of the filtering cap 46. In this manner, a consistent amount of wash fluid 36 from the toroidal flow 42 is able to pass through the inlets 50 and through the removable particulate chamber 52 of the filtering cap 46. Accordingly, greater amounts of particulate matter are able to move into the filtering cap 46 to be captured within the removable particulate chamber 52 for separating the pet hair and other particulate from the wash fluid 36 used to process the articles 60 within the drum 12.

Referring now to FIGS. 3-10, the receiver 30 for the impeller 10 includes a vertically-extending shaft 70. This vertically-extending shaft 70 receives the filtering cap 46 within the medial horizontal level 48 of the tub 16. This medial horizontal level 48 of the tub 16 is positioned below a typical level 72 of the wash fluid 36 within the drum 12 (as exemplified in FIG. 2) and above the upper surface 74 of the external vanes 24 for the impeller 10. This positioning allows the toroidal flow 42 of wash fluid 36 to move around the drum 12 and through a majority of the articles 60 being processed. In addition, the dispositioning of the filtering cap 46, generally above at least a majority of the articles 60, provides for a large volume of the wash fluid 36 to move through the removable particulate chamber 52 of the filtering cap 46.

Figure 4:
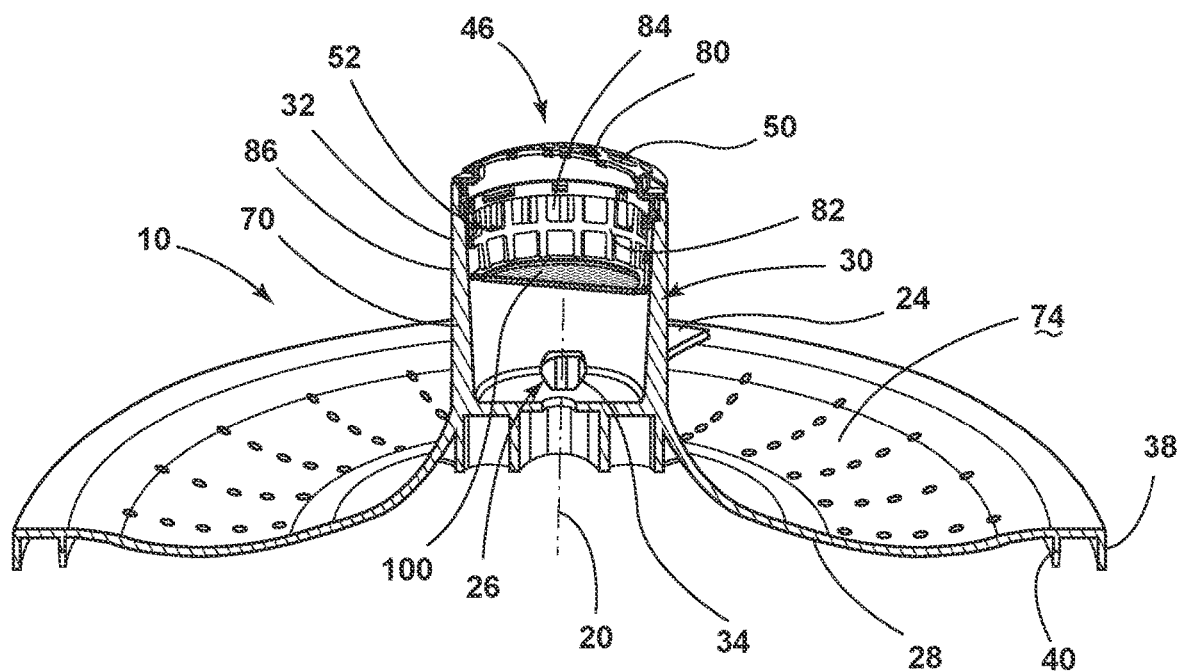
FIG. 4 is a perspective cross-sectional view of the impeller of FIG. 3, taken along line IV-IV, and showing the filtering cap attached to the receiver.
Figure 5:
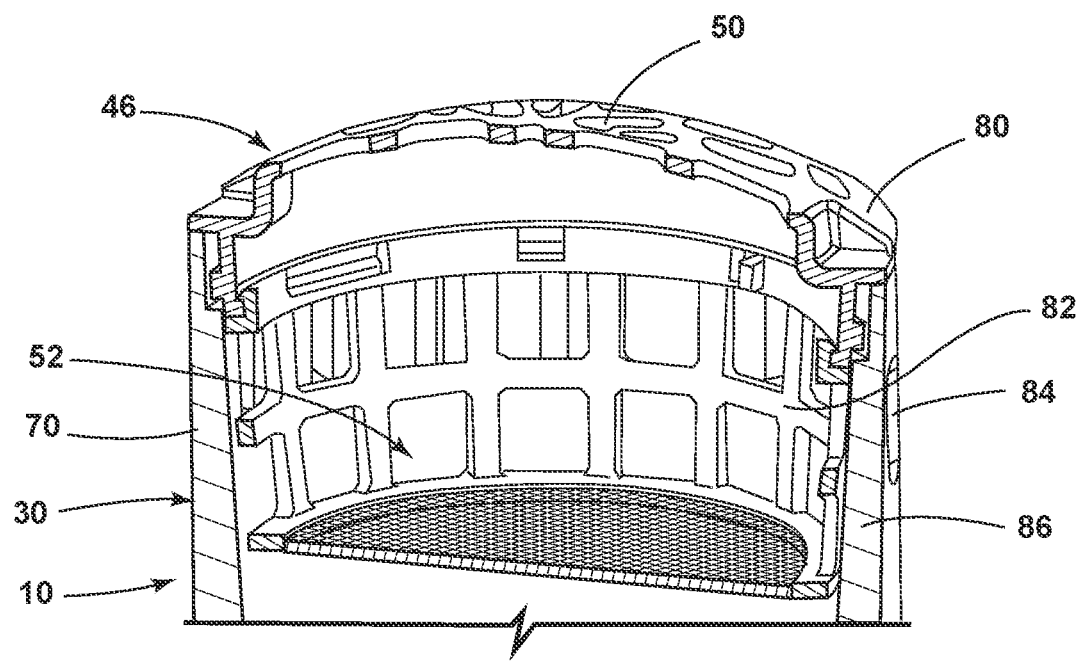
FIG. 5 is an enlarged cross-sectional view of the filtering cap of FIG. 4.
Figure 6:
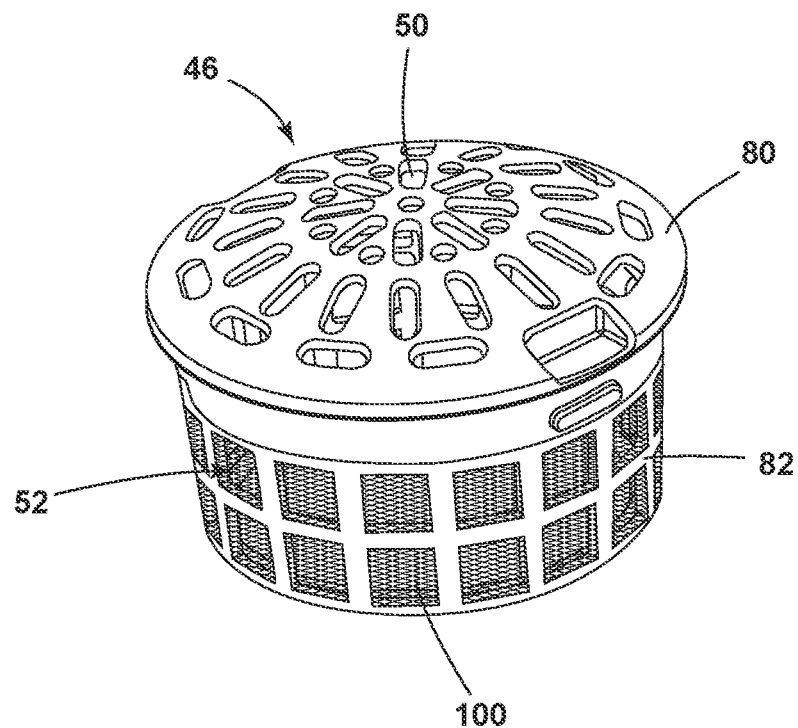
FIG. 6 is a perspective view of an aspect of the filtering cap.
Figure 7:
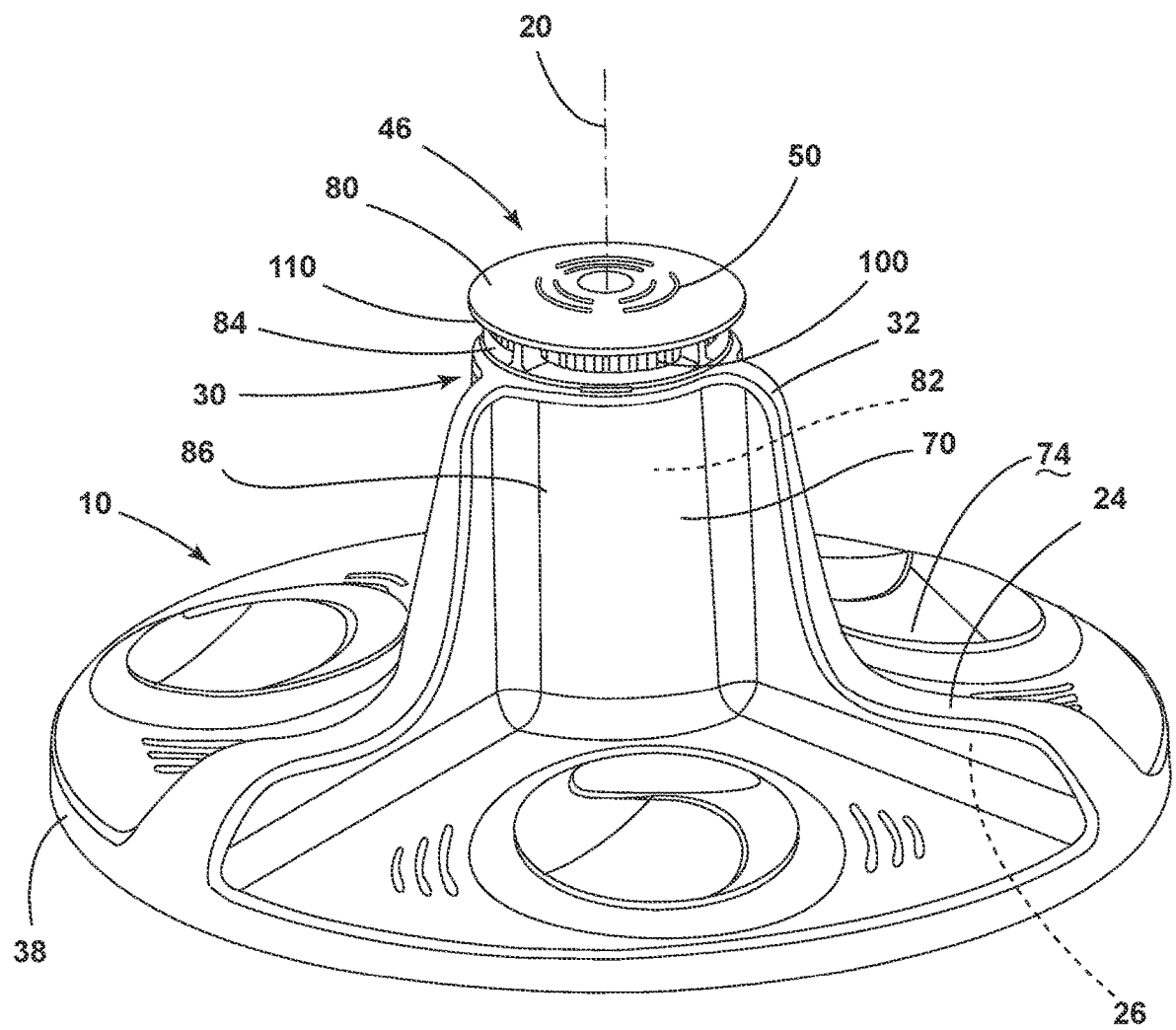
FIG. 7 is a perspective view of an impeller that incorporates an aspect of the filtering cap within the receiver.
Figure 8:
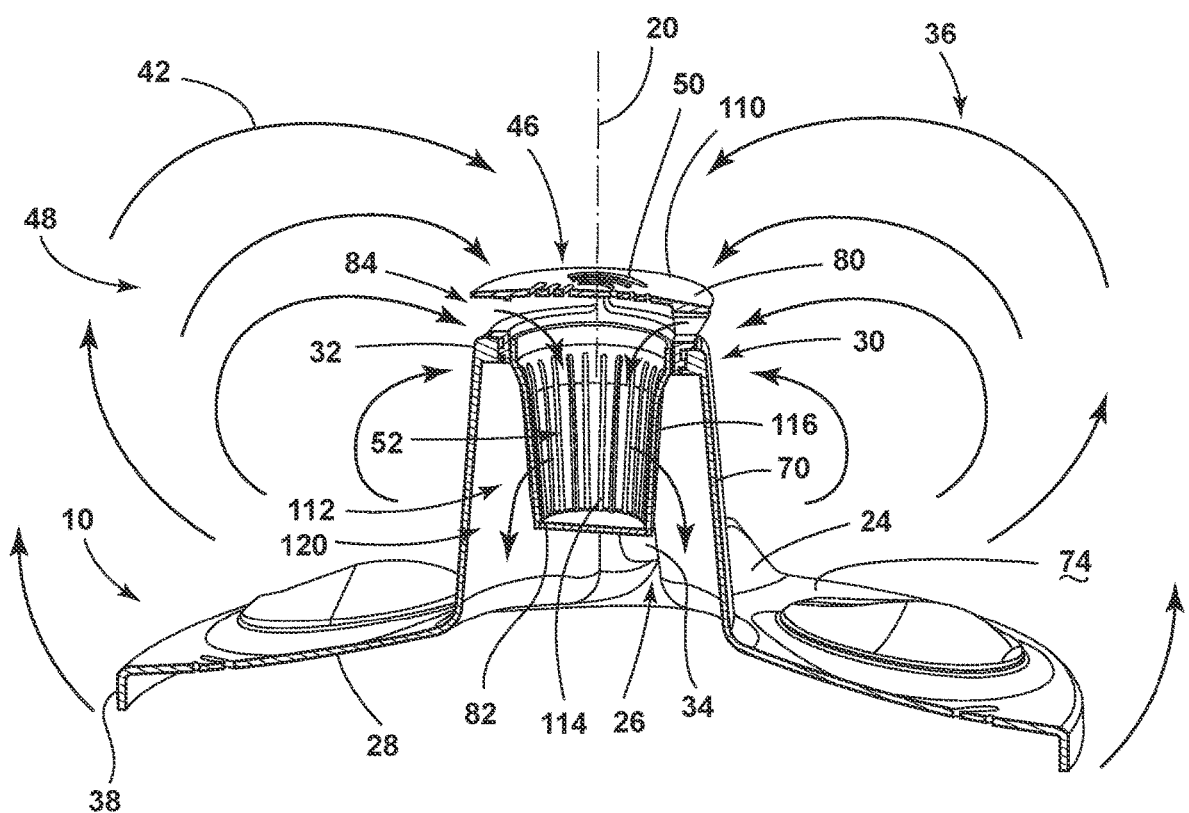
FIG. 8 is a schematic cross-sectional view of the impeller of FIG. 7 and showing the toroidal flow of wash fluid moving around the impeller.
Figure 9:
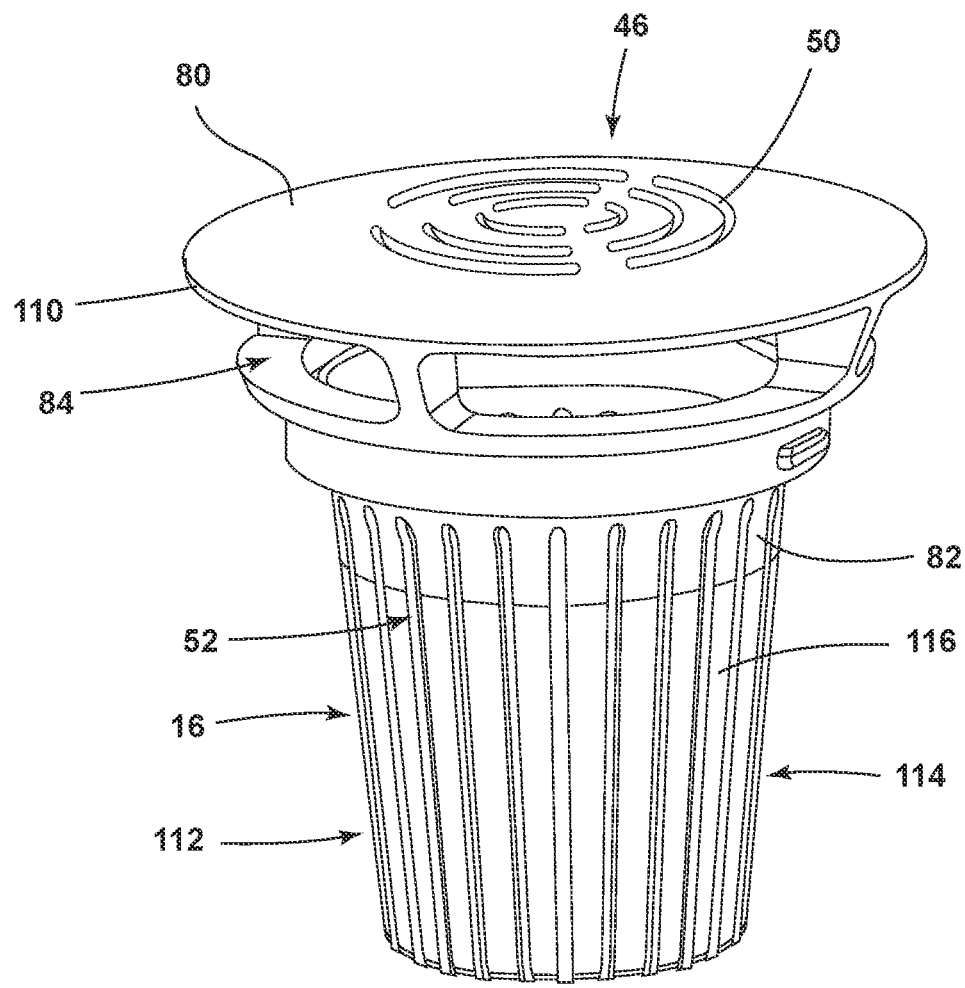
FIG. 9 is a side perspective view of an aspect of the filtering cap incorporated within the impeller of FIG. 7.
Figure 10:
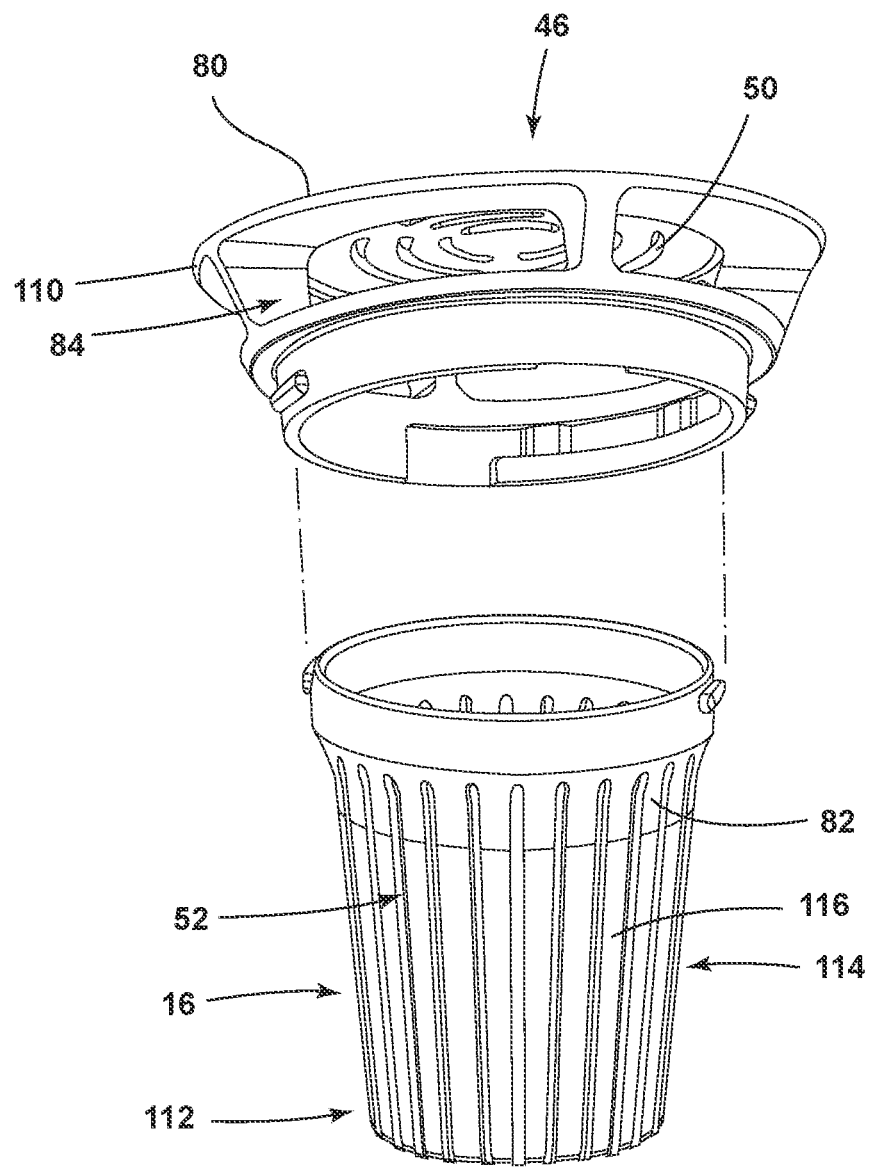
FIG. 10 is an exploded perspective view of the filtering cap of FIG. 9.
Figure 11:
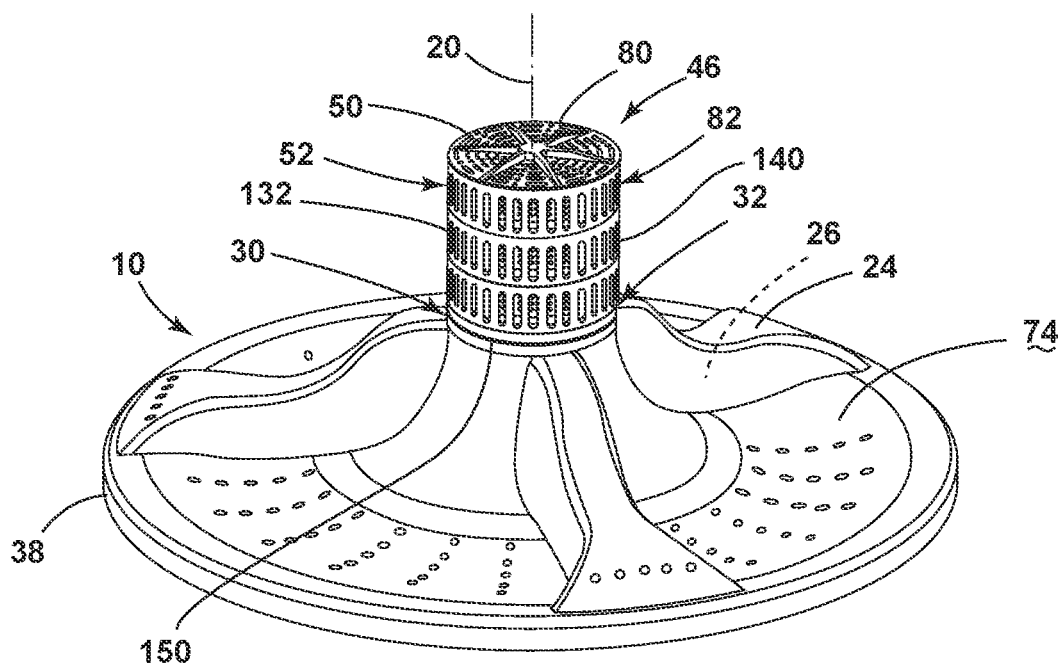
FIG. 11 is a perspective view of the impeller incorporating an aspect of the filtering cap.
Figure 12:
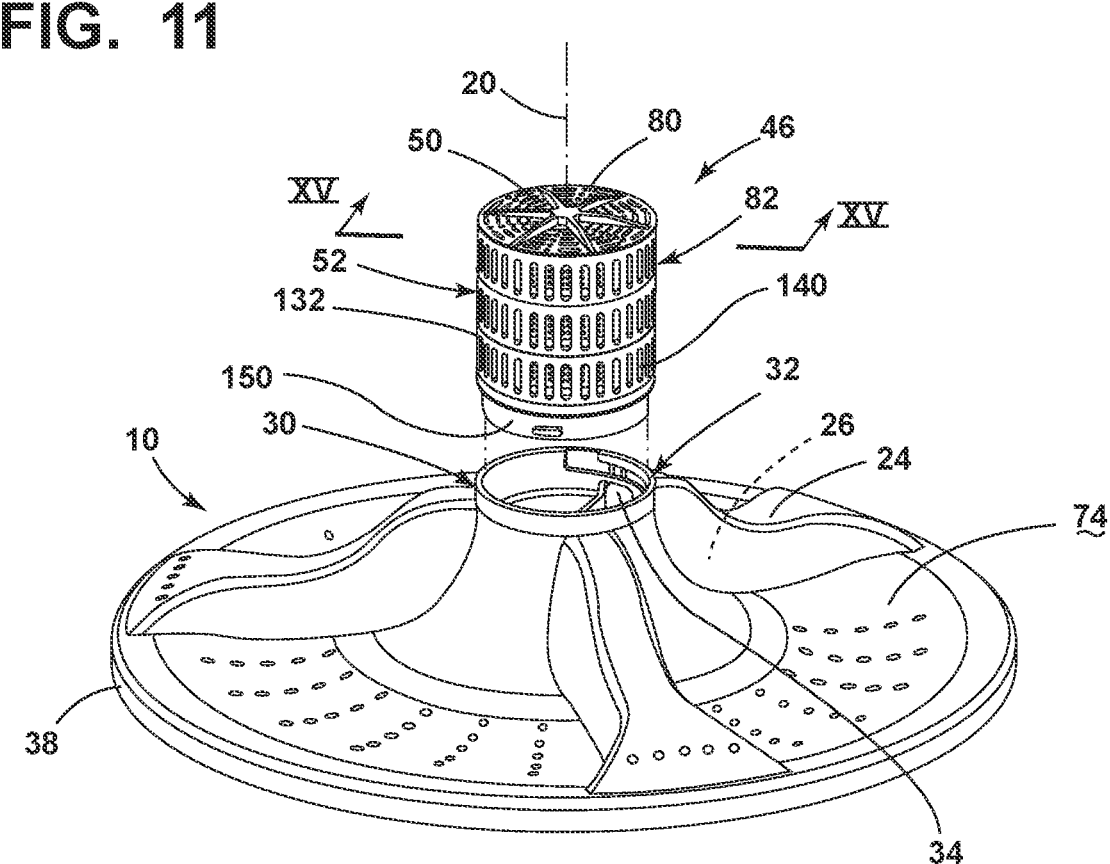
FIG. 12 is a partially exploded perspective view of the impeller of FIG. 11 and showing the filtering cap separated from the receiver.

Referring now to FIGS. 4-6, the filtering cap 46 can include the removable particulate chamber 52 that is positioned under the plurality of inlets 50 of the filtering cap 46. The filtering cap 46 typically includes a multi-piece construction that includes a cap member 80 and a filter member 82. The cap member 80 includes the inlets 50 that are positioned above the vertically-extending shaft 70 for receiving the wash fluid 36 from above the filtering cap 46. Additionally, the vertically-extending shaft 70 can include flow openings 84 that are positioned within a sidewall 86 of the vertically-extending shaft 70. These flow openings 84 are laterally aligned with the removable particulate chamber 52 that is defined within the filter member 82 of the filtering cap 46. Through this configuration, the wash fluid 36 is able to move vertically and laterally into the removable particulate chamber 52 for separating the pet hair and other particulate matter from the wash fluid 36.

Positioning of the flow openings 84 and the inlets 50 within the medial horizontal level 48 of the tub 16 prevents the articles 60 being processed from significantly blocking the toroidal flow 42 of wash fluid 36 into the removable particulate chamber 52. A majority of the articles 60 are positioned around the vertically-extending shaft 70 such that the wash fluid 36 can move through the articles 60 in the toroidal flow 42 and also through the removable particulate chamber 52 and the flow channels 26 of the impeller 10.

As exemplified in FIGS. 5 and 6, the filter member 82 includes the removable particulate chamber 52 that has a filtering mesh 100. This filtering mesh 100 is positioned at least at a bottom of the removable particulate chamber 52 to capture the particulate from the toroidal flow 42 of wash fluid 36. In certain aspects of the device, the filtering mesh 100 is also positioned around the filter member 82 and around the removable particulate chamber 52 such that particulate matter is captured within and around the filtering mesh 100 as the wash fluid 36 moves through the toroidal flow 42. The filter member 82 of the filtering cap 46 typically extends downward from the cap member 80. In this manner, the filter member 82 can be attached to the cap member 80 and the cap member 80 can be attached to the receiver 30 at the vertically-extending shaft 70. To assist in the movement of wash fluid 36 in the toroidal flow 42 and through the removable particulate chamber 52, the filter member 82 can include a grid that supports the filtering mesh 100 and also provides for the lateral movement of wash fluid 36 through the flow openings 84 and into the removable particulate chamber 52.

Referring now to FIGS. 7-10, the flow openings 84 and the inlets 50 that receive the toroidal flow 42 of fluid from the processing space 44 can all be included within the cap member 80. In this aspect of the device, the flow openings 84 can be positioned at a perimeter 110 of the cap member 80 to direct the toroidal flow 42 of wash fluid 36 through the removable particulate chamber 52 that includes a tapered configuration 112. In this tapered configuration 112, the toroidal flow 42 of wash fluid 36 entering the vertically-extending shaft 70 enters through the flow openings 84 at the perimeter 110 of the cap member 80 and through the filter member 82. The flow openings 84 can also be recessed under a portion of the cap member 80 to further prevent blockage or other interference from the articles 60 within the drum 12. Accordingly, the cap member 80 can have an enlarged top portion that extends over the flow openings 84.

Additionally, the tapered configuration 112 of the filter member 82 assists in directing the toroidal flow 42 of wash fluid 36 through the filtering structure 114 of the filter member 82. The filtering structure 114 can include various apertures or slots defined within the outer wall 116 of the filter member 82. It is also contemplated that a filtering mesh 100 can be used within the filter member 82 to further separate particulate matter from the wash fluid 36.

Referring again to FIGS. 7-10, the tapered configuration 112 of the filter member 82 provides for an enlarged flow space 120 that is positioned between the vertically-extending shaft 70 and the outer wall 116 of the filter member 82. This enlarged flow space 120 promotes the flow of wash fluid 36 through the removable particulate chamber 52, through the vertically-extending shaft 70 and then through the various flow apertures 34 within the receiver 30 that direct the wash fluid 36 through the respective flow channels 26 of the impeller 10.

Referring again to FIGS. 1-15, the impeller 10 for the appliance 14 includes the plurality of flow channels 26 that extend below the impeller 10 and between the impeller 10 and the drum 12. The receiver 30 is positioned at a top 32 of the impeller 10, where the receiver 30 includes flow apertures 34 that are in communication with the respective flow channels 26. These flow apertures 34 provide a communication between the removable particulate filter of the filtering cap 46 and the flow channels 26 positioned through and below the impeller 10. The filtering cap 46 is disposed on a top 32 of the receiver 30 and is positioned within a medial horizontal level 48 of the tub 16 and the drum 12. The filtering cap 46 includes a plurality of inlets 50 that direct the toroidal flow 42 into a removable particulate chamber 52 that is positioned within the filtering cap 46. The toroidal flow 42 is further directed through the respective flow channels 26 to continue through the toroidal flow 42 within the drum 12. Typically, the filtering cap 46 is a multi-part cap that includes a cap member 80 and at least one filter member 82.

Referring now to FIGS. 11-15, the washing appliance 14 includes a tub 16 that is positioned within the outer cabinet 18. The drum 12 is rotationally operable within the tub 16 about the vertical rotational axis 20. The impeller 10 is positioned within a lower portion 22 of the tub 16 and is rotationally operable relative to the drum 12 about the vertical rotational axis 20. The impeller 10 includes a plurality of respective flow channels 26 that extend along an underside 28 of the impeller 10. The receiver 30 is positioned at the top 32 of the impeller 10. The receiver 30 includes flow apertures 34 that are in communication with the respective flow channels 26 and provides communication between the filtering cap 46 and areas beneath the underside 28 of the impeller 10. The multi-part filtering cap 46 includes a central filtering chamber 130 that extends upward from the receiver 30.

A plurality of filter members 82 in the form of horizontal filter disks 132 are selectively positioned on top 32 of the receiver 30 and are attached to the central filtering chamber 130 to define a desired filtering height. The plurality of horizontal filter disks 132 define respective filter chambers 134 that are layered above the receiver 30. Each of the respective filter chambers 134 directs the wash fluid 36 into the central filtering chamber 130 and through the receiver 30 and, in turn, through the respective flow channels 26. The wash fluid 36 from one filter chamber 134 can also flow to an adjacent filter chamber 134 before being directed into the central filtering chamber 130. Through this configuration, the multi-part filtering cap 46 includes a vertical filter that extends upward from the receiver 30. This multi-layer configuration of the filtering cap 46 is able to receive wash fluid 36 from the toroidal flow 42 at a variety of vertical positions within the processing space 44. Accordingly, regardless of the amount of wash fluid 36 that is being used to process the articles 60 within the drum 12, the filtering cap 46 is able to receive the toroidal flow 42 of the wash fluid 36 during operation of the appliance 14.

Referring again to FIGS. 11-15, the filtering cap 46 includes the multi-layer filtration mechanism that includes the plurality of horizontal filter disks 132 and the central filtering chamber 130. Each of the horizontal filter disks 132 includes an outer perforated wall 140 that provides for the lateral movement of wash fluid 36 into the respective filter chambers 134 that cooperatively define the removable particulate chamber 52. It is contemplated that each of the stacked horizontal filter disks 132 define a dedicated section of the removable particulate chamber 52. As described herein, each of these layers receives wash fluid 36 from a particular vertical position within the toroidal flow 42 of wash fluid 36.

Referring again to FIGS. 11-15, each of the respective filter chambers 134 directs wash fluid 36 through the central filtering chamber 130 and then through the receiver 30. The wash fluid 36 is then directed through the respective flow channels 26 and beneath the impeller 10 to proceed through the toroidal flow 42 of wash fluid 36.

According to various aspects of the device, the plurality of horizontal filter disks 132 can be configured to be assembled at a desired filter height that relates to the number of horizontal filter disks 132 of the vertically-extending shaft 70 that are stacked on the receiver 30.

Figure 13:
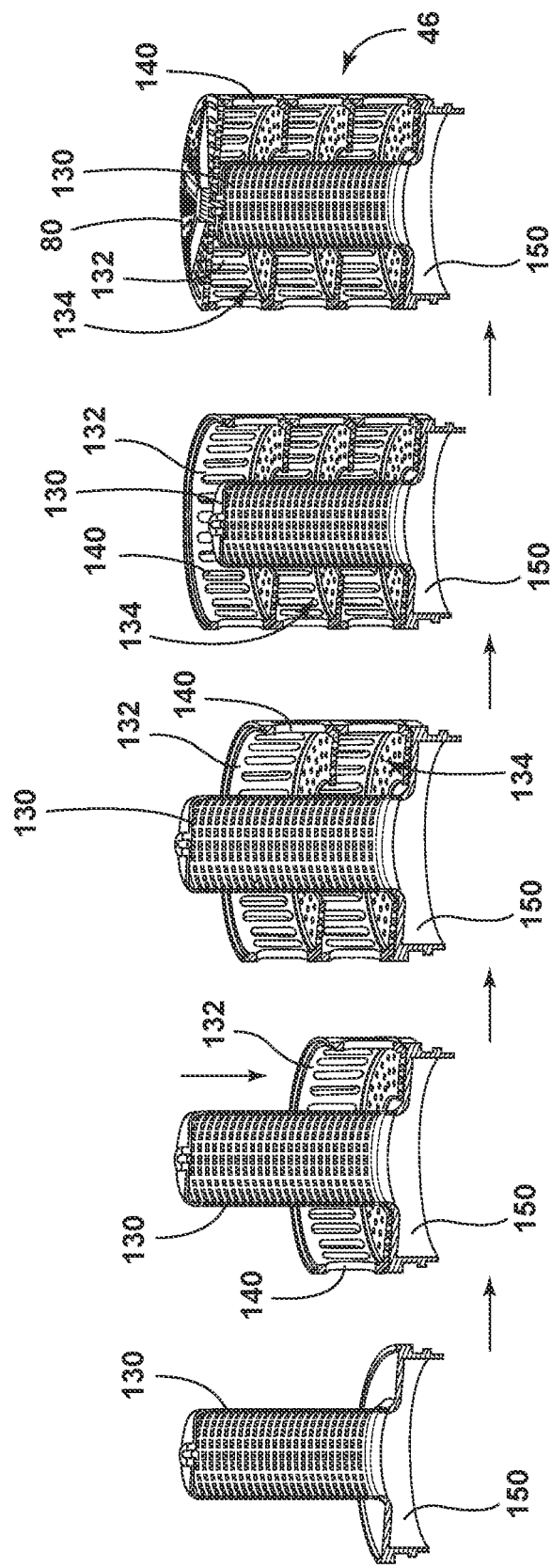
FIG. 13 is a series of cross-sectional perspective views showing assembly of the filtering cap of FIG. 11.
Figure 14:
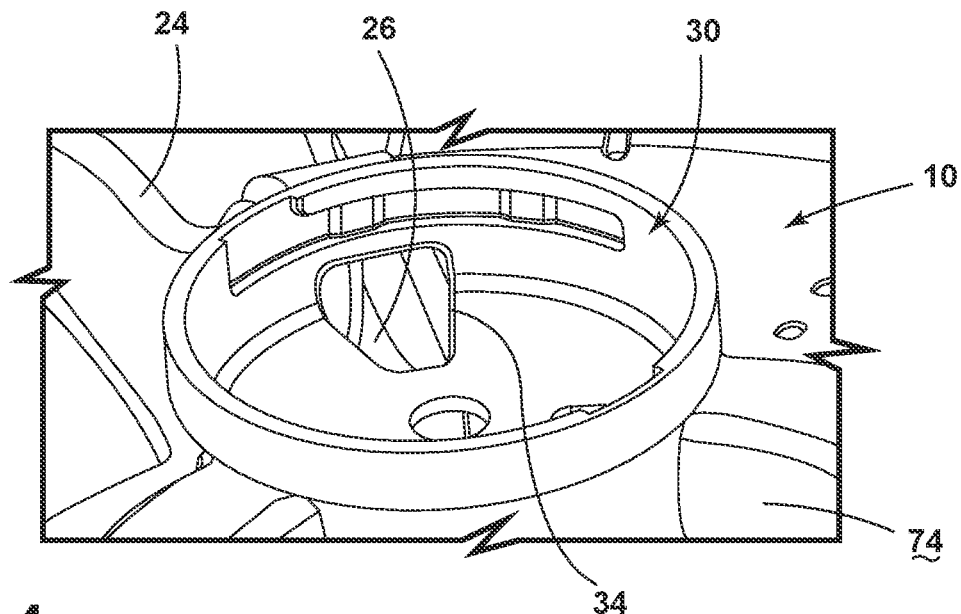
FIG. 14 is an enlarged perspective view of the receiver of FIG. 12.
Figure 15:
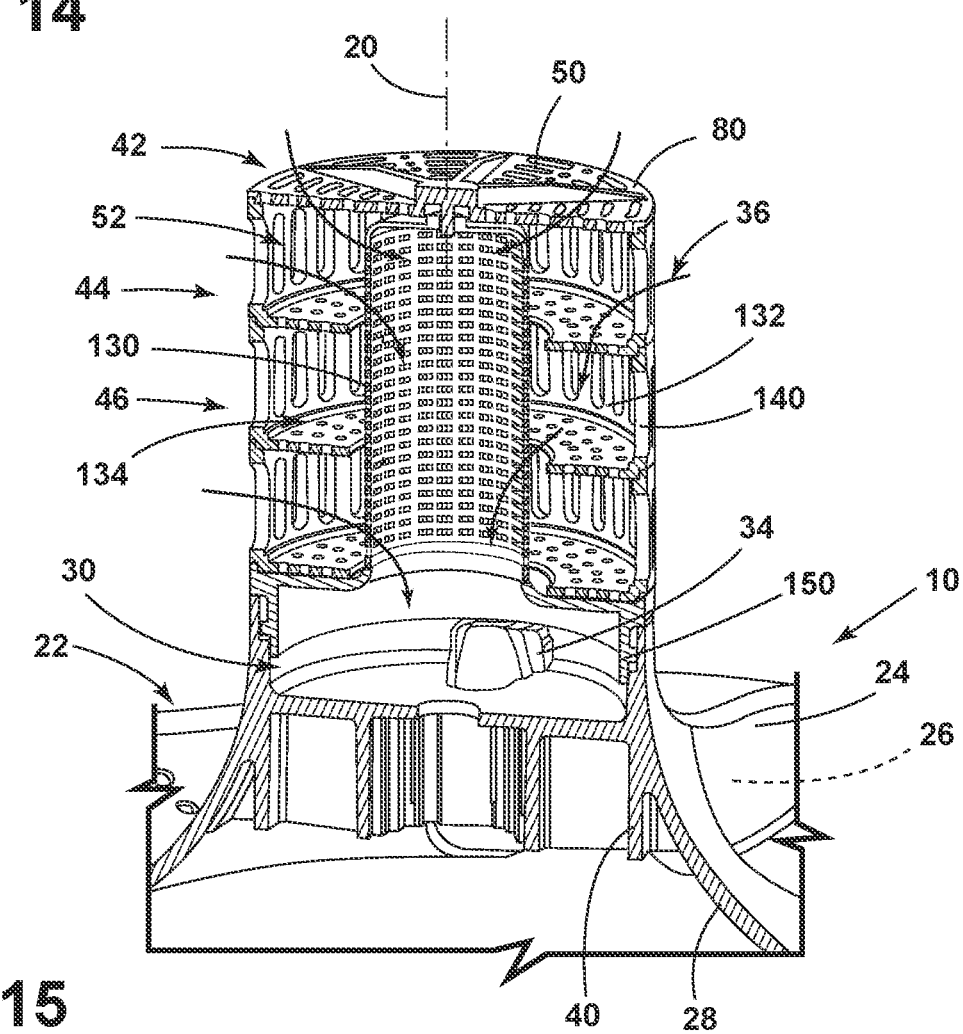
FIG. 15 is a cross-sectional perspective view of the impeller of FIG. 11 taken along line XV-XV.

As exemplified in FIGS. 13-15, typically, the user will assemble all of the horizontal filter disks 132 such that each time the filtering cap 46 is assembled, the filtering cap 46 is assembled to a full height of the central filtering chamber 130. After the horizontal filter disks 132 are attached to the central filtering chamber 130, a cap member 80 is attached to the top horizontal filter disk 132 and the central filtering chamber 130 to secure each of the horizontal filter disks 132 relative to one another and the central filtering chamber 130.

Referring again to FIGS. 11-15, the central filtering chamber 130 can be integral with, or can be attached to a base 150. The base 150 defines the attachment interface with the receiver 30 and securely positions the central filtering chamber 130 relative to the impeller 10. The various horizontal filter disks 132 are stacked on the base 150 and attached to the central filtering chamber 130. Through this configuration, the various horizontal filter disks 132 can be secured to the central filtering chamber 130 to form the filtering cap 46. Additionally, the cap member 80 can include a central threaded portion that is threadedly attached to the central filtering chamber 130. Through this configuration, the cap member 80 can place a downward biasing force onto the various horizontal filter disks 132 to secure them to one another and to the base 150 of the central filtering chamber 130. This configuration of the cap members 80 serves to provide a robust configuration of the filtering cap 46 that is made up of the multiple components described herein.

Referring again to FIGS. 1-15, the various configurations of the filtering cap 46 are typically secured onto the receiver 30 using various twist-lock mechanisms. These twist-lock mechanisms can include interference features that lock the filtering cap 46 into place relative to the receiver 30 and the remainder of the impeller 10. Because the impeller 10 operates rotationally within the drum 12, rotationally securing the filtering cap 46 is necessary to ensure that the filtering cap 46 does not separate from the impeller 10. Accordingly, the various interference mechanisms are secured into place to prevent this inadvertent separation from the impeller 10. It is also contemplated that the attachment of the filter member 82 to the cap member 80 includes a twist-lock mechanism that secures the filter member 82 to the cap member 80. Through this configuration, the filtering cap 46 can be attached together to form a unitary component that is secured to prevent unintentional separation of the filter member 82 from the cap member 80.

According to the various aspects of the device, the filtering cap 46 is used for receiving the toroidal flow 42 of wash fluid 36 from the drum 12 and directing this toroidal flow 42 through the removable particulate chamber 52. After completion of a laundry cycle, the filtering cap 46 can be removed from the receiver 30. Additionally, the filtering cap 46 can be separated by removing the cap member 80 from the filter member 82. Through this operation, the user can access the interior of the removable particulate chamber 52 for removing and discarding the captured pet hair and other particulate. Additionally, where the filtering cap 46 includes the plurality of horizontal filter members 82, the user can disassemble the filtering cap 46 to remove captured particulate matter from each of the filtering layers of the filtering cap 46.

As described herein, use of the filtering cap 46 is intended to capture particulate matter as it moves through the toroidal flow 42 of wash fluid 36. Positioning of the filtering cap 46 is generally above a majority of the articles 60 being processed so that the articles 60 do not block the various inlets 50 of the filtering cap 46. Additionally, the filtering cap 46 is positioned low enough such that, for most laundry cycles, the filtering cap 46 is entirely submerged within the wash fluid 36 that is used to process the various articles 60. This positioning of the filtering cap 46 provides for a continuous and toroidal flow 42 of wash fluid 36 through the drum 12 and through the filtering cap 46 for capturing the various particulate matter.

According to another aspect of the present disclosure, a washing appliance includes a tub that is positioned within an outer cabinet. A drum is rotationally operable within the tub about a vertical rotational axis. An impeller is positioned within a lower portion of the drum and is rotationally operable relative to the drum about the vertical rotational axis. The impeller includes a plurality of external vanes that define respective flow channels. A receiver is positioned at a top of the impeller. The receiver includes apertures that are in in communication with the respective flow channels. A plurality of structural ribs are disposed on an underside of the impeller. The respective flow channels and the plurality of structural ribs cooperate to promote a toroidal flow of wash fluid within the drum. A filtering cap is disposed on a top of the receiver and positioned within a medial horizontal level of the tub. The filtering cap includes a plurality of inlets that direct the toroidal flow into a removable particulate chamber that is positioned within the filtering cap. The toroidal flow is further directed through the respective flow channels to continue through the toroidal flow within the drum.

According to another aspect, the receiver includes a vertically-extending shaft that receives the filtering cap within the medial horizontal level of the tub.

According to yet another aspect, the vertically-extending shaft includes flow openings that are positioned within a sidewall of the vertically-extending shaft. The flow inlets are aligned with a filtering chamber that is defined within the filtering cap.

According to another aspect of the present disclosure, the filtering chamber includes a filtering mesh that surrounds the filtering chamber to capture particulate within the toroidal flow of wash fluid.

According to another aspect, the filtering cap includes a cap member and a filter member that extends downward from the cap member.

According to yet another aspect, the filter member includes a grid that supports a filtering mesh that defines a filtering chamber.

According to another aspect of the present disclosure, the cap member includes flow openings that direct the toroidal flow of fluid through the removable particulate chamber that includes a tapered configuration.

According to another aspect, the cap member is attached to the vertically-extending shaft and the removable particulate chamber is attached to the cap member.

According to yet another aspect, all of the toroidal flow of wash fluid entering the vertically-extending shaft moves through the cap member then through the filter member.

According to another aspect of the present disclosure, the filtering cap includes a vertical filter that extends upward from the receiver.

According to another aspect, the filtering cap includes a multi-layer filtration mechanism that includes a plurality of horizontal filter members and a central filtering chamber.

According to yet another aspect, the plurality of horizontal filter members each includes an outer perforated wall.

According to another aspect of the present disclosure, the plurality of horizontal filter members and the central filtering chamber defines respective filtering chambers that are layered above the receiver.

According to another aspect, each of the respective filtering chambers directs the wash fluid through the central filtering chamber and through the receiver and the respective flow channels.

According to yet another aspect, the plurality of horizontal filter members are configured to be assembled at a desired filter height that relates to the number of horizontal filter members of the vertically-extending shaft that are stacked on the receiver.

According to another aspect of the present disclosure, a washing appliance includes a tub that is positioned within an outer cabinet. A drum is rotationally operable within the tub about a vertical rotational axis. An impeller is positioned within a lower portion of the drum and is rotationally operable relative to the drum about the vertical rotational axis. The impeller includes a plurality of respective flow channels that extend along an underside of the impeller. A receiver positioned at a top of the impeller. The receiver includes apertures that are in communication with the respective flow channels. A multi-part filtering cap includes a central filtering chamber that extends upward from the receiver and a plurality of horizontal filter members that are selectively positioned on top of the receiver and attached to the central filtering chamber to define a desired filtering height. The plurality of horizontal filter members and the central filtering chamber define respective filtering chambers that are layered above the receiver. Each of the respective filtering chambers directs wash fluid through the central filtering chamber and through the receiver and the respective flow channels.

According to another aspect, the impeller includes a plurality of structural ribs disposed on an underside of the impeller. The respective flow channels and the plurality of structural ribs cooperate to promote a toroidal flow of wash fluid within the drum.

According to yet another aspect, the plurality of horizontal filter members each includes an outer perforated wall that directs the toroidal flow of wash fluid into the respective filtering chamber.

According to another aspect of the present disclosure, a washing appliance includes a tub that is positioned within an outer cabinet. A drum is rotationally operable within the tub about a vertical rotational axis. An impeller is positioned within a lower portion of the drum and is rotationally operable relative to the drum about the vertical rotational axis. The impeller includes a plurality of flow channels that extend below the impeller and between the impeller and the tub. A receiver is positioned at a top of the impeller. The receiver includes apertures that are in in communication with the respective flow channels. A filtering cap is disposed on a top of the receiver and positioned within a medial horizontal level of the tub. The filtering cap includes a plurality of inlets that direct a toroidal flow into a removable particulate chamber that is positioned within the filtering cap. The toroidal flow is further directed through the respective flow channels to continue through the toroidal flow within the drum.

According to another aspect, the filtering cap is a multi-part cap that includes a cap member and at least one filter member.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A washing appliance comprising:
   a tub that is positioned within an outer cabinet;
   a drum that is rotationally operable within the tub about a vertical rotational axis;
   an impeller that is positioned within a lower portion of the drum and is rotationally operable relative to the drum about the vertical rotational axis, the impeller comprising:

a plurality of external vanes that define respective flow channels, wherein the respective flow channels extend along an underside of the impeller and through the plurality of external vanes;

a receiver positioned at a top of the impeller and having a vertically-extending outer wall, the receiver including apertures that are in communication with the respective flow channels;

a plurality of structural ribs disposed on the underside of the impeller, wherein the respective flow channels and the plurality of structural ribs cooperate to promote a toroidal flow of wash fluid within the drum; and a filtering cap disposed on a top edge of the receiver and positioned within a medial horizontal level of the tub, the filtering cap having a plurality of inlets that direct the toroidal flow into a removable particulate chamber that is positioned within the filtering cap, and wherein the toroidal flow is further directed through the respective flow channels to continue through the toroidal flow within the drum, wherein the removable particulate chamber is configured to capture particulate from the toroidal flow and retain the particulate within an interior of the filtering cap, the filtering cap including a cap member and a filter member that extends downward from the cap member, wherein the filter member selectively attaches to the cap member to define the removable particulate chamber, and wherein the cap member selectively attaches to the top edge of the vertically-extending outer wall to define a top surface of the impeller.

2. The washing appliance of claim 1, wherein the vertically-extending outer wall includes flow openings that are positioned within a sidewall of the vertically-extending outer wall, and wherein the flow openings are aligned with the removable particulate chamber that is defined within the filtering cap.

3. The washing appliance of claim 2, wherein the filtering cap includes a filtering mesh that surrounds the removable particulate chamber to capture the particulate within the toroidal flow of the wash fluid.

4. The washing appliance of claim 1, wherein the filter member includes a grid that supports a filtering mesh of the removable particulate chamber, wherein the toroidal flow is directed through inlets defined within a top surface of the filtering cap and into the removable particulate chamber, the toroidal flow moving from the removable particulate chamber and through the filtering mesh, wherein the particulate is captured within the removable particulate chamber and the toroidal flow is directed to the respective flow channels.

5. The washing appliance of claim 1, wherein the apertures of the receiver correspond to the respective flow channels defined by the plurality of external vanes.

6. The washing appliance of claim 1, wherein the filter member is disposed within and separated from the vertically-extending outer wall.

7. The washing appliance of claim 1, wherein the flow channels extend to an outer edge of the impeller.

8. The washing appliance of claim 1, wherein the impeller is independently operable relative to the drum.

9. The washing appliance of claim 1, wherein the plurality of external vanes extend from the vertically-extending outer wall of the receiver.

10. The washing appliance of claim 1, wherein the cap member is secured to the vertically-extending outer wall via a twist-lock interface.

11. The washing appliance of claim 10, wherein the filter member is attached to the cap member via a separate twist-lock interface.

12. A washing appliance comprising:

a tub that is positioned within an outer cabinet;

a drum that is rotationally operable within the tub about a vertical rotational axis;

an impeller that is positioned within a lower portion of the drum and is rotationally operable relative to the drum about the vertical rotational axis, the impeller comprising:

a plurality of flow channels that extend below the impeller and between the impeller and the tub;

a receiver positioned at a top of the impeller and having a vertically-extending outer wall, the receiver including apertures that are in communication with the respective flow channels, wherein the apertures correspond to, and are aligned with, respective external vanes of the impeller; and a filtering cap disposed on a top edge of the vertically-extending outer wall of the receiver, the filtering cap including a cap member that is selectively attached to the top edge of the vertically-extending outer wall of the receiver, and a filter member that is selectively separable from the cap member and extends downward from the cap member to define the removable particulate chamber, the filtering cap defining a top surface of the impeller and positioned within a medial horizontal level of the tub, wherein the filtering cap includes a plurality of inlets that direct a toroidal flow into a removable particulate chamber that is positioned within the filtering cap, and wherein the toroidal flow is further directed through the respective flow channels to continue through the toroidal flow within the drum, and wherein the toroidal flow is directed through the plurality of inlets defined within a top portion of the filtering cap, the toroidal flow moving through the removable particulate chamber, wherein particulate within the toroidal flow is separated from the toroidal flow and captured within the removable particulate chamber that is defined within the filtering cap, and wherein the toroidal flow continues through the removable particulate chamber to the apertures of the receiver.

13. The washing appliance of claim 12, wherein the filtering cap is a multi-part cap that includes a cap member and at least one filter member, wherein the cap member and the at least one filter member define the removable particulate chamber within the filtering cap.

14. The washing appliance of claim 12, wherein the vertically-extending outer wall includes flow openings that are positioned within a sidewall of the vertically-extending outer wall, and wherein the flow openings are aligned with the removable particulate chamber that is defined within the filtering cap.

15. The washing appliance of claim 14, wherein the filtering cap includes a filtering mesh that surrounds the removable particulate chamber to capture the particulate within the toroidal flow of wash fluid, wherein the filtering mesh defines the removable particulate chamber within the filtering cap.

16. The washing appliance of claim 12, wherein the apertures of the receiver correspond to the respective flow channels defined by the respective external vanes.

17. The washing appliance of claim 12, further comprising:

a plurality of structural ribs positioned below the impeller, wherein the respective flow channels and the plurality of structural ribs cooperate to promote the toroidal flow of wash fluid within the drum.

18. The washing appliance of claim 17, wherein the plurality of structural ribs are attached to an underside of the impeller.

19. The washing appliance of claim 12, wherein the respective external vanes extend from the vertically-extending outer wall of the receiver.

20. The washing appliance of claim 12, wherein the cap member is secured to the vertically-extending outer wall via a twist-lock interface, and wherein the filter member is attached to the cap member via a separate twist-lock interface.

* * * * *